United States Patent  [11] 3,614,240

[72] Inventors Conrad W. Brandts
 Dahlgren;
 Eugene P. Stemple, King George; Richard A. Frazer, King George, all of Va.
[21] Appl. No. 828,099
[22] Filed May 21, 1969
[45] Patented Oct. 19, 1971
[73] Assignee The United States of America as represented by the Secretary of the Navy

[54] OPTICAL TARGET POSITION INDICATOR
 1 Claim, 1 Drawing Fig.
[52] U.S. Cl. .................................................. 356/152,
 250/203, 178/6, 178/DIG. 21
[51] Int. Cl. ................................................... G01b 11/26
[50] Field of Search ......................................... 178/7.2, 6;
 356/4, 218, 152; 315/11, 31; 250/203

[56] References Cited
 UNITED STATES PATENTS
3,240,942 3/1966 Birnbaum et al. ............ 250/203

Primary Examiner—Richard A. Farley
Assistant Examiner—S. C. Buczinski
Attorneys—E. J. Brower, A. L. Branning and T. O. Watson, Jr.

ABSTRACT: This invention is a circuit which produces electrical signals that describe the two-dimensional position of an image on the photocathode surface of a scannable photomultiplier. The photomultiplier is provided with deflecting coils and a masking electrode with a small aperture is spaced from the photocathode. When light from a distant target impinges on the photosensitive surface of the photomultiplier, an electron stream is emitted by the surface. The deflecting coils focus this stream on the aperture in the masking electrode to cause the photomultiplier to emit a signal. This signal activates sample-and-hold circuits which detect the outputs of the deflecting coils and hold them until another signal is received from the photomultiplier. The signals detected by the sample-and-hold circuits are representative of the target position as sensed by the photomultiplier.

3,614,240
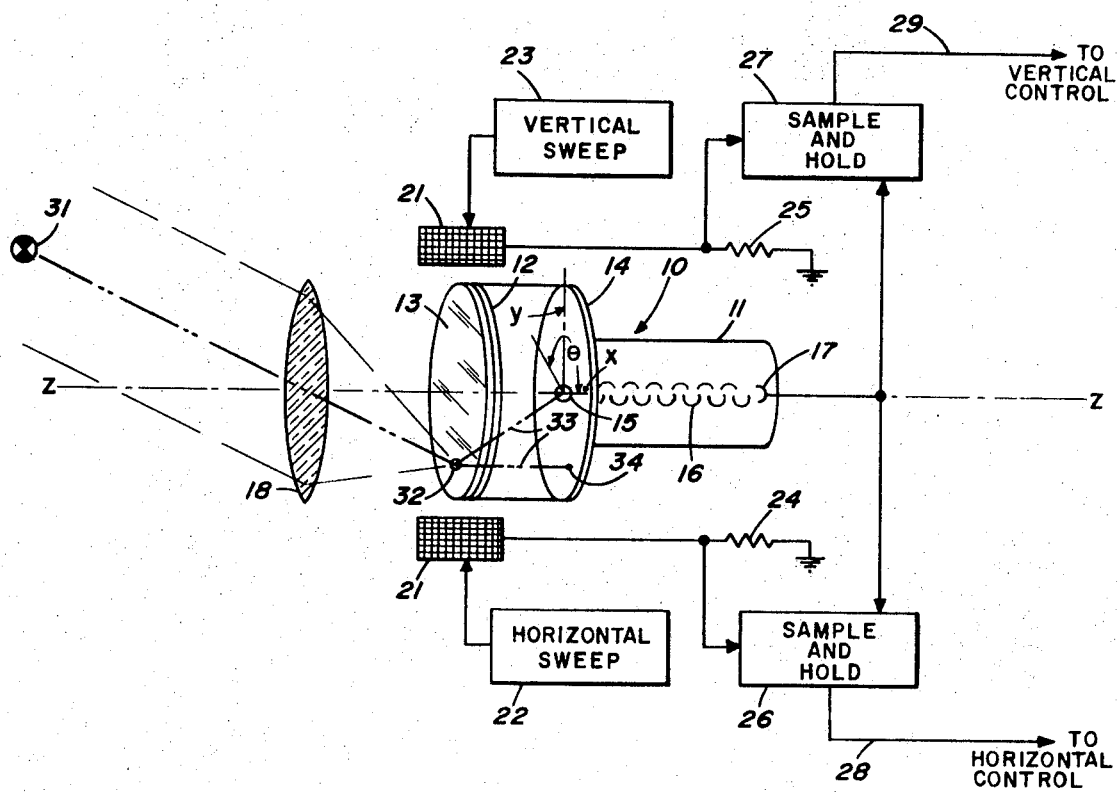
INVENTORS
CONRAD W. BRANDTS
EUGENE P. STEMPLE
RICHARD A. FRAZER
BY
ATTORNEYS

3,614,240

OPTICAL TARGET POSITION INDICATOR

STATEMENT OF GOVERNMENT INTEREST

The invention described herein may be manufactured and used by or for the Government of the United States of America for government purpose therefor.

BACKGROUND OF THE INVENTION

1 Field of the Invention

This invention relates to the field of electro-optic tracking. More particularly, it relates to an electro-optic circuit that provides an output which is purposes therefor. of the position of a target being tracked. This output can then be used to control the position of a tracking mirror in a tracking system.

2. Description of the Prior Art

In the prior art one circuit for achieving this function utilized a plurality of photoelectric cells. These cells were placed in the optical image plane and the target direction was determined by noting which of the photoelectric cells was excited by light from the target. The resolution obtained by this system is limited by the size and number of photocells utilized and the readings are very coarse.

A second circuit found in the prior art utilized a photomultiplier tube similar to the inventive circuit. This circuit scanned an electron beam across an aperture in masking electrode but relied on a complex demodulating system. This system required the use of filters tuned to harmonics of the sweep frequency. Harmonics are difficult to detect and limit the response which can be obtained.

A further disadvantage found in these and in all other prior art circuits used in electro-optic tracking is that there is no provision for intermittent loss of the target. In addition, many of these circuits are dependent on the magnitude of the optical signal received from a target.

SUMMARY OF THE INVENTION

The present invention represents a substantial improvement over the prior art. The inventive circuit has a high degree of resolution. The control signal sensed by the circuit is a linear function of the target's displacement from the optical axis of the circuit and does not have to be demodulated.

The inventive system utilizes a photomultiplier which has a masking electrode with a small aperture on the optical axis of the system. An electron stream is generated when the optical image of the target is focused on the photomultiplier. The tube utilizes horizontal and vertical deflecting coils which scan the photomultiplier and direct the electron stream through the aperture in the masking electrode. When this occurs vertical and horizontal sample and hold circuits are triggered and sample the current through resistors connected in series with the horizontal and vertical deflecting coils. The sample-and-hold circuits then hold this signal until the deflecting coils again direct the electron stream into the masking aperture. When used in a tracking system, the hold mode insures operation of the system during intermittent loss of the target. The sampling operation is such that it is not dependent on the magnitude of the signal received. Any type of scanning pattern may be utilized in the inventive circuit.

It is therefore an object of the present invention to provide a new and improved electro-optic circuit that has an output which is indicative of the position of a target.

Another object of the present invention is to provide a high resolution electro-optic tracking circuit.

It is a still further object of the present invention to provide an electro-optic tracking circuit which is unaffected by the intermittent loss of a target.

Other object, advantages and novel features of the invention will become apparent from the following detailed description of the invention when considered in conjunction with the accompanying drawing.

BRIEF DESCRIPTION OF THE DRAWING

The FIGURE shows the schematic of the circuit with a cross-sectional view of the photomultiplier.

DESCRIPTION OF THE PREFERRED EMBODIMENT

The inventive circuit as seen in the FIGURE utilizes a scannable photomultiplier tube 10. The tube is supplied by the International Telephone and Telegraph Company and carries the designation FW130.

The tube has an envelope 11 with a photocathode 12 formed on its transparent faceplate 13. A masking electrode 14 is mounted in the envelope rearwardly of the photocathode 12. There is a small circular aperture 15 in the masking electrode. The aperture is centered on the optical axis Z of the system and has a diameter of 0.014 inches.

The tube 10 further includes a multistage electron multiplier section 16 mounted behind masking electrode 14 to receive the electrons which pass through aperture 15. An anode 17 is provided to collect the output of the multiplier section. A lens 18 is mounted in front of the faceplate 13.

Horizontal and vertical deflecting coils 21 are associated with the tube. These coils are operative in response to signals from horizontal and vertical sweep generators 22 and 23 to scan an electron beam from photocathode 12 over the entire surface of masking electrode 14. The sweep generators can provide any type of sweep pattern such as spiral, raster or lissajous. The type of pattern utilized is not a critical factor with the inventive circuit as long as the entire surface of masking electrode is scanned.

Resistors 24 and 25 are connected in series with each of the horizontal and vertical deflection coils. Horizontal and vertical sample-and-hold circuits 26 and 27 are provided to sense the voltages across the resistors 24 and 25.

Sample-and-hold circuits 26 and 27 are turned on in response to a signal from the photomultiplier 10 at anode 17. These circuits sample voltages across resistors 26 and 27 in response to the gating signal from photomultiplier 10 and hold it until they are again gated or until the signal decays. The output of the sample-and-hold circuits at 28 and 29 can be used to control the position of a tracking mirror in an electro-optic tracking system. "Redcor" sample-and-hold modules were utilized in the inventive circuit.

In operation, light from a distant target 31 is focused by lens 18 onto the photocathode 13 at 32 for example. When the light strikes the photocathode a stream of electrons is given off and strikes the masking electrode 14 at 34.

The optical axis Z of the system passes through the center of the faceplate 13 and the photocathode 12 and the position of the target 31 in space which appears as a spot of light at 32 can be described with reference to the horizontal and vertical axis $x$ and $y$ drawn perpendicular to the optical axis Z at a photocathode 12 and masking electrode 14.

Thus, in the inventive system when the target lays on the optical axis Z its position is defined by $x=0$, $y=o$. When the target is off the optical axis as shown in the drawing $x$ and $y$ have finite values which describe the target's position.

The sweep generators 22 and 23 are referenced to the $x=0$ and $y=o$ point for the particular sweep pattern implemented. The systems, which utilize the outputs of the sample-and-hold amplifiers 26 and 27, are similarly referenced so that the voltages detected by the sample-and-hold amplifiers are referenced to zero at the $x=0$ and $y=0$ point.

Assuming by way of example that the sinusoidal scan is utilized, the horizontal and vertical sweep generators would be two oscillators oscillating at two different frequencies. These frequencies could be adjusted for different tracking situations. This type of scan is advantageous because it does not require complex logic or demodulating circuits and it gives a greater coverage at the edges of the photocathode. When the target is on the optical axis, the image on the photocathode will be at the point $x=0$, $y=0$ and the currents induced in the horizontal and vertical coils by sweep generators 22 and 23 would be at the zero reference level. The potentials applied by the sweep generators to the deflection coils would cause an electron stream which is emitted from the center of the cathode at the point $x=o$, $y=0$ to trace a sinusoidal raster type of pattern on electrode 14. This has the opposite effect of establishing a continuous variety of field configurations in envelope 11, one of which will be operative to direct an electron stream into aperture 15 from each emission point on photocathode 12.

Turning now to the example shown in the FIGURE, the electron stream 33 from the target image at 32 initially strikes masking electrode 14 at 34. The sweep generators are then turned on and the current in the deflection coils increases. This current varies the field configuration in the envelope between the photocathode and masking electrodes in accordance with the sweeping signal applied. This moves the electron stream 33 towards the aperture 15. When the current in the coils is such as will deflect the electron stream into the aperture 15, the photomultiplier will detect a pulse at 17 from multiplier stage 16. This pulse triggers the sample-and-hold circuits 26, 27 and they sense the current in the coils 21 by sensing the voltage across resistors 24 and 25. When the electron stream is moved off the aperture by the deflection current, the sample-and-hold circuits retain their voltages until they are again pulsed by the tube 10.

The voltage sensed by the sample-and-hold circuits is proportional to the position of the target image with respect to the *x and y* axis of the photocathode and hence is a measure of the traget's position in space. These voltages can then be fed at 28 and 29 to a tracking mirror or the like to correct its position for changes in the target's position. A system such as this is shown in application Ser. No. 825,225 by Richard A. Frazer, filed May 16, 1969.

After the target is initially sensed, the sweep generators 22 and 23 repeat their sweep pattern to correct the positional information sensed by the sample-and-hold circuits. Since mechanical motion is not involved, the scanning speed may be made rapid enough to provide essentially continuous target position information.

The inventive circuit compensates for intermittent loss of the target through use of the sample-and-hold circuits. These circuits retain their last detected voltage until a new signal activates the sample mode. In the absence of a signal from the target a tracking system using this method would tend to continue moving in the same direction and at the same speed until either the signal reappears or the voltage being held by the sample-and-hold amplifiers decays.

Thus, it is seen that a new and improved electro-optic circuit for providing target position information has been shown. The resolution of the inventive circuit is high. It is not dependent on the magnitude of the signal from a target and is unaffected by intermittent target loss. It should be understood that the inventive circuit is not limited to the details illustrated and described by way of explanation.

Obviously many modification and variations of the present invention are possible in the light of the above teachings.

What is claimed is:

1. An electro-optic circuit for indicating the position of a target comprising:

A photomultiplier tube having a photocathode for emitting a stream of electrons, an aperture positioned for receiving said stream of electrons and means for producing a signal in response to electrons passing through the aperture;

means for deflecting the electron stream toward said aperture; said deflecting means including a vertical sweep circuit and a horizontal sweep circuit;

first and second sampling means connected to the vertical sweep circuit and horizontal sweep circuit respectively and to the signal producing means of the photomultiplier tube for measuring the current of the vertical and horizontal sweeps when said stream of electrons is deflected through the aperture; said first and second sampling means including holding means for retaining sampled signals; said holding means adapted to provide continuous tracking in the same direction and at the same speed during intermittent loss of a target.